United States Patent [19]

Stapfer

[11] 3,899,465

[45] *Aug. 12, 1975

[54] SYNERGISTIC ORGANOTIN STABILIZER COMPOSITIONS AND RESINS STABILIZED THEREWITH

[75] Inventor: Christian H. Stapfer, Aachen, Germany

[73] Assignee: Cincinnati Milacron Chemicals, Incorporated, Reading, Ohio

[*] Notice: The portion of the term of this patent subsequent to July 2, 1991, has been disclaimed.

[22] Filed: June 18, 1974

[21] Appl. No.: 480,487

Related U.S. Application Data

[63] Continuation-in-part of Ser. No. 189,038, Oct. 13, 1971, Pat. No. 3,822,233, which is a continuation-in-part of Ser. No. 780,888, Dec. 3, 1968, Pat. No. 3,630,993.

[52] U.S. Cl. ....... 260/45.75 S; 260/45.7 S; 252/406; 260/45.75 T
[51] Int. Cl.² .......................................... C08F 6/00
[58] Field of Search ................ 260/45.75 S, 45.7 S; 252/406

[56] References Cited
UNITED STATES PATENTS
3,822,233  7/1974  Stapfer............................ 260/45.75

Primary Examiner—V. P. Hoke
Attorney, Agent, or Firm—Fisher, Christen & Sabol

[57] ABSTRACT

An improved stabilized composition comprises a synergistic combination of an organic thiolanhydride and a monohydrocarbyl tin compound of the formula $$R^3Sn(Z)_n(Z^1R^4)_{3-2n}$$

wherein $R^3$ is a hydrocarbyl radical having one to 12 carbon atoms, Z and $Z^1$ are either oxygen or sulfur, $R^4$ is hydrogen or an organic radical bonded to $Z^1$ by a carbon atom and $n$ is a number from 0 to 1.5 varying in increments of one-half.

Halide containing resins stabilized with these compositions exhibit improved resistance to the development of early color during processing.

10 Claims, No Drawings

SYNERGISTIC ORGANOTIN STABILIZER COMPOSITIONS AND RESINS STABILIZED THEREWITH

This application is a continuation-in-part of my copending application Ser. No. 189,038 filed Oct. 13, 1971, now U.S. Pat. No. 3,822,233 continuation-in-part of my earlier copending application Ser. No. 780,888, filed Dec. 3, 1968, now U.S. Pat. No. 3,630,993.

This invention relates to organotin stabilizers and halide containing resins stabilized therewith. More particularly, the invention relates to a synergistic combination of organic thiolanhydrides with monohydrocarbyltin compounds which reduces the development of early color during processing when incorporated as a stabilizer in halogen containing resins.

During recent years the use of thiolanhydrides corresponding to the formula $$R^1\overset{O}{\underset{}{\overset{\|}{C}}}S\overset{O}{\underset{}{\overset{\|}{C}}}R^2,$$

wherein $R^1$ and $R^2$ are independently selected hydrocarbon groups with six to 20 carbon atoms, have been contemplated as stabilizers against the thermal decomposition of halogen containing resins, and particularly polyvinyl chloride. These thiolanhydrides are desirable because they exhibit good long term stabilizing efficacy for both plasticized and rigid formulations, but they have never gained commercial importance because of the substantial discoloration of polymers which occurs during processing. The discoloration is unrelated to the stabilizing properties of the thiolanhydrides; however, it severely restricts the commercial use because of the serious detraction from the esthetic appeal of products.

I have discovered that organic thiolanhydrides containing small amounts of monohydrocarbyltin compounds corresponding to the formula $R^3Sn(Z)_n(Z^1R^4)_{3-2n}$ wherein $R^3$ is a hydrocarbyl group containing one to 12 carbon atoms, Z and $Z^1$ are independently selected from oxygen and sulfur, $R^4$ is hydrogen or an organic radical bonded to $Z^1$ by a carbon atom and $n$ is a number from 0 to 1.5 varying in increments of one-half overcome the disadvantages of the prior art.

Suitable thiolanhydrides for practicing the present invention include those where $R^1$ and $R^2$ are the same or different alkyl or aryl radicals. The alkyl radicals may be straight chain radicals producing anhydrides such as thiollauric or thiolstearic anhydride; branched chain radicals producing anhydrides such as 1-thiol-2-ethylhexoic and unsaturated alkyl radicals such as those producing thiol crotonic anhydride. The aryl radicals suitable for practicing the present invention include unsubstituted aryl producing anhydrides such as thiolbenzoic anhydride or alkyl substituted aryl radicals producing thiolanhydrides such as 2-tert.butylthiolbenzoic anhydride. An example of suitable thiolanhydrides which have different $R^1$ and $R^2$ groups is thiollauricbenzoic anhydride.

The monohydrocarbyl tin compounds suitable for arresting the development of early color in halogen containing resins stabilized with organic thiolanhydrides include stannoic oxides, stannoic sulfides, stannoic acids and thiostannoic acids having one hydrocarbyl group attached to the tin atom. The hydrocarbyl group preferably contains one to 12 carbon atoms and may be an alkyl, aryl, alkaryl or aralkyl radical except butyl thiostannoic acid or butyl tin sulfide. Examples of this group of compounds include methylstannoic acid, methylthiostannoic acid, butyl stannoic acid, butyl tin oxide, n-octyl stannoic acid, isooctyl stannoic acid, n-octyl thiostannoic acid, isooctyl thiostannoic acid and phenyl stannoic acid. These compounds frequently exist in the form of polymers which are condensation products of the above stannoic and thiostannoic acids as well as mixtures of stannoic and thiostannoic acids. The condensation products may contain 2 to 1,000 repeat units and generally contain 2 to 100 repeat units corresponding to the formula $[R^3Z_n]_y$ wherein Z is oxygen, sulfur or a mixture of oxygen and sulfur, $n$ equals 1.5 and Y denotes the degree of polymerization such as methyltin sulfide and octyltin sulfide.

Monohydrocarbyl tin compounds suitable for practicing the present invention include compounds where $R^4$ is a hydrocarbon radical, preferably alkyl, having one to 12 carbon atoms. Some examples of suitable compounds include the methyl, butyl, n-octyl and isooctyl esters of both monohydrocarbyl stannoic and thiostannoic acids such as the isooctyl ester of butylstannoic acid and compounds of the formula $R^3Sn(SR^4)$ such as methyltin tris (lauryl mercaptide), butyl tin tris (stearyl mercaptide) and octyl tin tris (stearyl mercaptide).

The monohydrocarbyl tin compounds can also have a functional group attached to $Z^1$ by a carbon atom and are useful in practicing the present invention. Functional groups of this type include

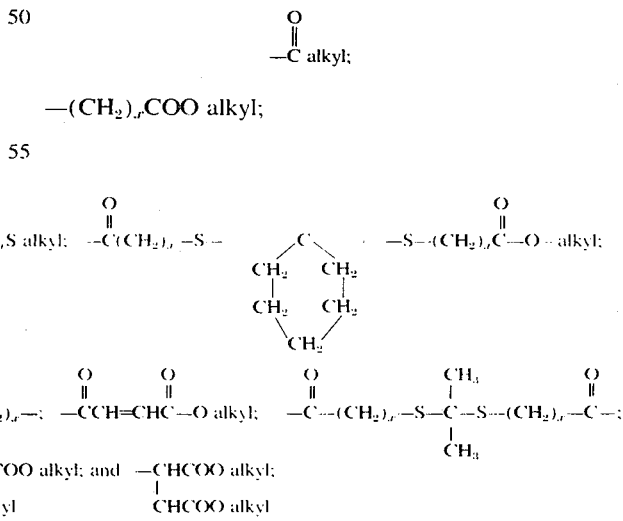

wherein $x$ is 1 to 3. Some examples of monohydrocarbyl tin compounds containing these groups are monomethyltin tris (isooctyl mercaptoacetate), monomethyltin tris (isooctyl mercaptopropionate), monobutyltin tris (isooctyl mercaptoacetate), monobutyl tin tris (isooctyl mercaptopropionate), monobutyltin tris (isooctyl-3-mercapto butyrate), methyltin tris (isooctyl maleate), monobutyltin tris (isooctyl maleate), octyltin tris (isooctyl maleate), methyltin trilaurate, butyltin tristearate, octyltin tristearate, and monobutyl tin tris [cyclohexylidene bis (thio propionic acid) monobutyl ester]. Some examples of monohydrocarbyl compounds having Z and $Z^1$ unalike are bis [monobutyltin di(isooctyl mercaptoacetate)] oxide, poly [mercaptopropionate di(butylstannoxy)], bis (monobutyl tin diisoocylmercapto propionate) oxide and poly[butyl stannoxy cyclohexylidene bis (thiopropionate)].

The preferred monohydrocarbyl compounds for practicing the present invention are those which correspond to one of the following formulae:

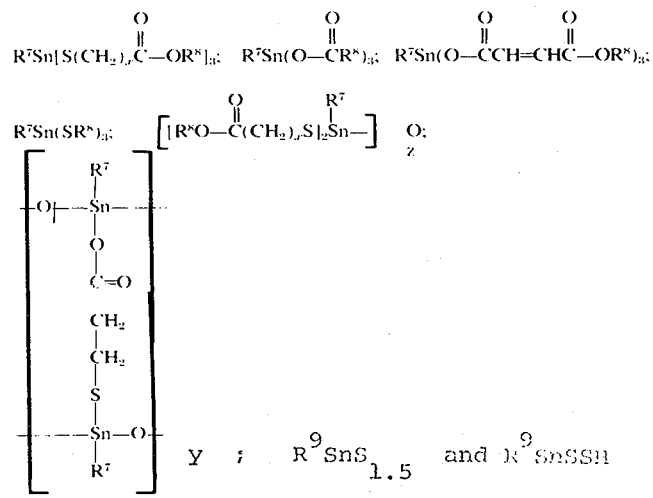

wherein $R^7$ is an alkyl having one to 12 carbon atoms, $R^8$ is an alkyl having one to 20 carbon atoms, $R^9$ is an alkyl having one to 12 carbon atoms, $x$ is 1 or 2 and $y$ is 2 to $\infty$.

The monohydrocarbyl tin compounds are generally used in amounts varying from 1 to 25 weight per cent of the thiolanhydride in stabilizers of the present invention usually 2.5 to 15 weight per cent and preferably in amounts of 4 to 12 weight per cent. The synergistic stabilizers of the present invention are generally incorporated into a resin in amounts of 0.1 to 10 weight per cent and preferably from 0.5 to 5 weight per cent.

The synergistic action of the monohydrocarbyltin compounds of the present invention is demonstrated to be unexpected in view of the poor results obtained when di- and trialkyl tin compounds are combined with organic thiolanhydride stabilizers.

Resins which may be stabilized by the synergistic composition of the present invention include both rigid and plasticized formulations of halogen containing polymers particularly polyvinyl chloride and polyvinylidene chloride, copolymers of halogen containing resins with ethylenically unsaturated compounds such as, copolymers of vinyl acetate and vinyl chloride and the like.

The following examples are presented to demonstrate several embodiments of the present invention as well as several embodiments of the invention claimed in my above mentioned U.S. Pat. No. 3,630,993 and are not to be considered as limitations thereon.

EXAMPLE 1

Three formulations were prepared. Each formulation contained 100 parts GEON 103P (a general purpose polyvinyl chloride resin suspension manufactured by B. F. Goodrich Company), 0.5 parts of mineral oil and a total of 2 parts of the stabilizer as indicated in Table 1. Each formulation was processed on a two roll mill at 320°F. for 5 minutes and then divided into a number of 1 inch × ½inch × 1/6 inch samples, the samples of each formulation were then placed in an air circulatory oven at 370° and a sample of each formulation was removed from the oven at 10 minute intervals over an interval of one hour. Formulations 1 and 2 were tested for comparative purposes and do not represent embodiments of the present invention. Table 1 reports the composition of the stabilizers tested. Very slight discoloration represents the time at which visually detectable discoloration of the test sample was first noticed and moderate discoloration represents the time at which an orange or red discoloration was observed while substantial discoloration or thermal decomposition was observed as very dark red, brown or black color in the sample.

TABLE 1

| No. | Stabilizer Composition in parts (p.) of formulation | Time in minutes to: | | |
|---|---|---|---|---|
| | | Very slight discoloration | Moderate discoloration | Substantial discoloration |
| 1. | 2.0 p. Thiollauric anhydride | | 10 | 20 |
| 2. | 2.0 p. Methyl tin sulfide | 0* | 20 | 40 |
| 3. | 1.9 p. Thioolauric anhydride 0.1 p. Methyl tin sulfide | 30 | 40 | 50 |

*Repeating this test using stearic thiolanydride or benzoic thiolanhydride produce substantially the same synergistic improvement in comparison with either of the components alone.

EXAMPLE 2

Formulations, each containing 100 parts of PVC 40 (a general purpose polyvinyl chloride resin manufactured by the Diamond-Shamrock Corp.), 25 parts dioctylphthalate, 5 parts epoxidized soybean oil, 0.25 parts stearic acid and 2 parts of the respective stabilizers as indicated in Table 2, were milled, divided and exposed according to the procedure described in Example 1. The results of the tests are reported in Table 2.

EXAMPLE 3

Eight formulations were prepared as described in Example 2 for the respective stabilizers as indicated in Table 3 and the formulations were processed in the same manner described in Example 1 except oven exposure was extended 30 minutes. The following table reports the results of the test with formulations 1 and 5 not being embodiments of the present invention and included for comparative purposes only and with formulations 2–4 and 6–8 illustrating the invention claimed in my above-mentioned U.S. Pat. No. 3,630,993.

TABLE 3

| Stabilizer composition No. | in parts (p.) | | Very slight discoloration | Time in minutes to: Moderate discoloration | Substantial discoloration |
|---|---|---|---|---|---|
| 1 | 2.0 p. | Thiolstearic anhydride | —* | —** | 10 |
| 2 | 1.9 p. | Thiolstearic anhydride | | | |
|   | 0.1 p. | butylstannoic acid | 10 | 30 | 90 |
| 3 | 1.9 p. | Thiolstearic anhydride | | | |
|   | 0.1 p. | methyl stannoic acid | 10 | 90 | — |
| 4 | 1.9 p. | Thiolstearic anhydride | | | |
|   | 0.1 p. | phenylstannoic acid | 10 | 60 | 80 |
| 5 | 2.0 p. | Thiolbenzoic anhydride | — | 10 | 90 |
| 6 | 1.9 p. | thiolbenzoic anhydride | | | |
|   | 0.1 p. | butylstannoic acid | 10 | 60 | — |
| 7 | 1.9 p. | Thiolbenzoic anhydride | | | |
|   | 0.1 p. | methyl stannoic acid | 10 | 50 | — |
| 8 | 1.9 p. | Thiolbenzoic anhydride | | | |
|   | 0.1 p. | phenylstannoic acid | 20 | 80 | 90 |

*slight yellowing developed during milling
**very strong discoloration after 10 minutes, decomposition at 80 minutes

EXAMPLE 4

Three formulations were prepared containing 100 parts of PVC 40 (a general purpose polyvinyl chloride resin manufactured by the Diamond-Shamrock Corp.), 25 parts dioctylphthalate, 5 parts epoxidized soybean oil, 0.25 parts stearic acid and 2 parts of the respective

TABLE 2

| No. | Stabilizer Composition in parts (p.) of formulation | | Very slight discoloration | Time in minutes to: Moderate discoloration | Substantial discoloration |
|---|---|---|---|---|---|
| *1 | 2.0 p. | Thiollauric anhydride | + | 10 | 20 |
| 2 | 1.9 p. | Thiollauric anhydride | | | |
|   | 0.1 p. | methyltin tris (isooctyl mercaptopropionate) | 30 | 40 | 50 |
| *3 | 2.0 p. | methyltin tris (isooctyl mercaptopropionate) | 10 | 20 | 40 |
| 4 | 1.9 p. | Thiollauric anhydride | | | |
|   | 0.1 p. | butyltin tris (isooctyl mercaptoacetate) | 30 | 50 | 50 |
| *5 | 2.0 p. | butyltin tris (isooctyl mercaptoacetate) | 10 | 30 | 40 |
| 6 | 1.9 p. | Thiollauric anhydride | | | |
|   | 0.1 p. | butyltin tris (isooctyl maleate) | 20 | 40 | 50 |
| *7 | 2.0 p. | butyltin tris (isooctyl maleate) | 5 | 10 | 20 |
| 8 | 1.9 p. | Thiollauric anhydride | | | |
|   | 0.1 p. | octyltin tristearate | 20 | 30 | 40 |
| *9 | 2.0 p. | octyltin tristearate | 10 | 20 | 30 |
| 10 | 1.9 p. | Thiollauric anhydride | | | |
|   | 0.1 p. | octyltin tris (lauryl mercaptide) | 30 | 40 | 50 |
| *11 | 2.0 p. | octyltin tris (lauryl mercaptide) | 15 | 25 | 40 |

*These tests are not according to the present invention and are presented only for comparative purposes.
+yellowing began during milling stabilizers listed in Table 2 were milled, divided and exposed according to the procedure described in Example 1 except that the oven exposure was conducted for 90 minutes. The results of this test are reported in Table 4 with formulation 2 being according to the invention claimed in my above-mentioned U.S. Pat. No. 3,630,993 and formulation 1 and 3 not being embodiments of the present invention and included for comparative purposes to demonstrate the synergistic effect of the stabilizers of the present invention.

TABLE 4

| No. | Stabilizer composition in parts (p.) | | Very slight dis- color- ation | Moderate dis- color- ation | Sub- stantial discolor- ation |
|---|---|---|---|---|---|
| 1 | 2.0 p. | Thiollauric anhydride | 10 | 20 | 90 |
| 2 | 1.9 p. | Thiollauric anhydride | | | |
| | 0.1 p. | butylstannoic acid | — | 50 | — |
| 3 | 0.1 p. | Butylstannoic acid | —* | 10 | 50 |

*slight yellowing began during milling

EXAMPLE 5

Six formulations more rigid than those of Examples 1–4 were prepared by mixing 100 parts of Opalan 630 (a suspension of polyvinyl chloride manufactured by Monsanto Corporation), 10 parts dioctylphthalate, 5 parts epoxidized soybean oil and 0.2 parts of stearic acid and 2.0 parts of the stabilizer as indicated in Table 5 was processed according to the procedure described in Example 1. Table 5 reports the results of this test. Formulation 1 is not an embodiment of the present invention and is included for comparative purposes only. Formulations 2–4 represent embodiments of the invention claimed in my above-mentioned U.S. Pat. No. 3,630,993.

TABLE 5

| No. | Stabilizer composition in parts (p.) | Time in minutes to slight discoloration |
|---|---|---|
| 1 | 2.0 p. Thiollauric anhydride | —* |
| 2 | 1.9 p. Thiollauric anhydride 0.1 p. monobutyltin tris [cyclohexylidene bis (thiopropionic acid) monobutyl ester] | 30 |
| 3 | 1.9 p. Thiollauric anhydride 0.1 p. polybutyl stannoxy cyclohexylidene bis (thiopropionate)] | 30 |
| 4 | 1.9 p. Thiollauric anhydride 0.1 p. butyl stannoic acid | 30 |
| 5 | 1.9 p. Thiollauric anhydride 0.1 p. monobutyltin sulfide | 20 |
| 6 | 1.9 p. Thiollauric anhydride 0.1 p. monobutyltin tris (isooctylmercapto propionate) | 20 |

*discoloration developed during milling

The formulation stabilized with thiollauric anhydride alone developed early color during the milling operation and had a distinct yellow color after 20 minutes of oven exposure while all formulations containing stabilizers of the present invention did not develop any discoloration until 20 minutes of exposure to heat.

EXAMPLE 6

The procedure of Example 5 was followed to prepare four formulations except that the amount of butylstannoic acid used as the co-stabilizer with thiollauric anhydride was varied between 0 and 7.5 weight per cent based on the thiollauric anhydride. Each formulation contained 2.0 parts thiollauric anhydride and the following table reports the results of the above test for each formulation. Formulation 1 does not represent the present invention and formulations 2–4 represent the invention claimed in my above-mentioned U.S. Pat. No. 3,630,993.

TABLE 6

| Formulation | Amount of butyl stannoic acid in part per 100 | Time in minutes to slight discoloration |
|---|---|---|
| 1 | 0 | —* |
| 2 | 0.05 | 20 |
| 3 | 0.1 | 30 |
| 4 | 0.15 | 20 |

*Developed slight yellow color during milling

EXAMPLE 7

Six formulations were prepared according to the procedure of Example 6 except that monobutyltin tris [cyclohexylidene bis (thiopropionic acid) monobutyl ester] was substituted for the butyl stannoic acid in Example 6 and the tests were extended to formulations containing up to 20 per cent of the monobutyltin tris [cyclohexylidene bis (thiopropionic acid) monobutyl ester]. The results of these tests are reported in Table 7 and formulation 1 is not according to the present invention but included for comparison purposes only. Formulations 2–6 illustrate the invention claimed in my above-mentioned U.S. Pat. No. 3,630,993.

TABLE 7

| Formulation | Amount of co-stabilizer in part per 100 | Time to very slight or first discoloration |
|---|---|---|
| 1 | 0 | —* |
| 2 | 0.05 | 30 |
| 3 | 0.1 | 30 |
| 4 | 0.15 | 30 |
| 5 | 0.2 | 20 |
| 6 | 0.3 | 20 |

*slight yellowing developed during milling

EXAMPLE 8

Four formulations of 100 parts PVC 40, 25 parts dioctyl phthalate, 5 parts epoxidized soybean oil, 0.25 parts of stearic acid, 1.9 parts thiollauric anhydride and 0.1 part of the stabilizer as indicated in Table 8 were processed according to the procedure of Example 1. The results of the test are reported in Table 8. Formulation 1 illustrates the invention claimed in my above-mentioned patent and formulations 2–4 do not represent the present invention or the invention claimed in my above-mentioned U.S. Pat. No. 3,630,993.

TABLE 8

| Formulation | Stabilizer Composition | First Color | Serious Degradation |
|---|---|---|---|
| 1 | butyl stannoic acid | 40 | 90 |
| 2 | dioctyl tin bis (isooctyl thioglycolate) | 10 | 80 |
| 3 | dioctyl tin maleate | 10 | 80 |
| 4 | bis tributyl tin oxide | 0 | 50 |

The test of Example 8 clearly demonstrates that only monohydrocarbyl tin compounds produce the synergistic results obtained by the stabilizers of the present invention.

EXAMPLE 9

Five formulations were prepared according to Example 1, except that 2.0 parts of the stabilizers or stabilizer combination set forth in Table 9 below were used. The formulations were processed in the same manner described in Example 1. The following table gives the results wherein formulations 2 and 4 are embodiments of this invention and formulations 1 and 3 are not.

TABLE 9

| No. | Thiollauric Anhydride Amt. in pph. | Monohydrocarbyltin Name | Amt. in pph. | Color Exposure In Minutes | | |
|---|---|---|---|---|---|---|
| | | | | Very slight | Moderate | Substantial |
| 1 | 2.0 | None | — | 10 | 20 | |
| 2 | 1.9 | Butyl tin tris (isooctylmercapto propionate) | 0.1 | 20 | 30 | 40 |
| 3 | 0 | " | 2.0 | 20 | 30 | 40 |
| 4 | 1.9 | butyl tin sulfide | 0.1 | 50 | 60 | 60 |
| 5 | 0 | " | 2.0 | 40 | 50 | 60 |

EXAMPLE 10

Eight preparations were made and tested as follows. In each preparation, a master batch consisted of 100 parts of PVC 40, a general purpose polyvinylchloride resin manufactured by Diamond-Shamrock Corporation, 25 parts dioctylphthalate, 5 parts epoxidized soybean and 0.25 parts stearic acid. Equal portions of the master batch were blended with 2 parts per 100 of, respectively, each one of the stabilizers or stabilizer combinations noted in Table 10 by milling for 5 minutes at 320°F. The portions were sheeted off, cut into strips and tested in an air-circulating oven at 370°F. At 10 minute intervals, a sample of each portion was removed and evaluated for early color and degradation by visual observation. The following Table reports the results of these tests. None of these preparations represent the present invention.

TABLE 10

| No. | Thiollauric Anhydride Amt. in pph. | Dihydrocarbyltin Name | Amt. in pph. | Color Exposure in Minutes | | |
|---|---|---|---|---|---|---|
| | | | | Very slight | Moderate | Substantial |
| 1 | 1.9 | dibutyltin bis (isooctyl mercapto acetate | 0.1 | 0 | 10 | 40 |
| 2 | 0.0 | " | 2.0 | 20 | >100 | |
| 3 | 1.9 | dibutyltin bis (isooctyl maleate | 0.1 | 0 | 10 | 30 |
| 4 | 0.0 | " | 2.0 | 20 | >100 | |
| 5 | 1.9 | dioctyltin distearate | 0.1 | 0 | 10 | 30 |
| 6 | 0.0 | " | 2.0 | 0 | 10 | 40 |
| 7 | 1.9 | dioctyltin bis (lauryl mercaptide | 0.1 | 0 | 10 | 30 |
| 8 | 0.0 | " | 2.0 | 10 | >100 | |

The results of the above tests show that, while the dihydrocarbyltin compounds used by themselves are good long term stabilizers, they provide little if any advantage when used in combination with thiollauric anhydride.

What is claimed is:

1. A stabilizing composition for vinyl halide resins selected from the group consisting of polyvinyl chloride, polyvinylidene chloride, copolymers of vinyl chloride and vinylidene chloride, copolymers of vinyl chloride with other ethylenically unsaturated monomers and mixtures thereof comprising a synergistic combination of (1) a thiolanhydride corresponding to the formula

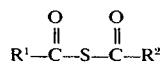

$$R^1-\overset{O}{\underset{\|}{C}}-S-\overset{O}{\underset{\|}{C}}-R^2$$

wherein $R^1$ and $R^2$ are hydrocarbyl radicals containing 6 to 20 carbon atoms and (2) 2.5 to 15 weight per cent based on said thiolanhydride of a monohydrocarbyltin compound corresponding to a formula selected from the group consisting of

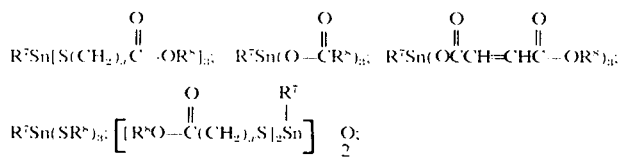

$$R^3Sn[S(CH_2)_nC(O)-OR^5]_3; \quad R^3Sn(O-CR^5)_3; \quad R^3Sn(OCCH=CHC(O)-OR^5)_3$$

$$R^3Sn(SR^5)_3; \quad \left[R^5O-C(O)(CH_2)_nS\right]_2Sn\Big]O;$$

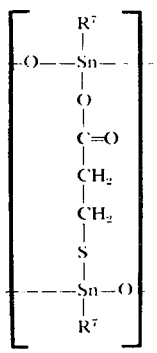

$Y: R^9SnS_{1.5}$ and $R^9SnSSH$, wherein $R^9$ is an alkyl $R^9SnS_{1.5}$ and
$R^9SnSSH$,
wherein $R^7$ is an alkyl having one to 12 carbon atoms, $R^8$ is an alkyl having one to 20 carbon atoms; $R^9$ is an alkyl having one to 12 carbon atoms, $x$ is 1 or 2 and $y$ is at least 2.

2. The stabilizing composition of claim 1 wherein (1) is selected from the group consisting of thiollauric anhydride, thiolstearic anhydride and thiolbenzoic anhydride and (2) is selected from the group consisting of methyltin tris (isoocytl mercaptopropionate), butyltin tris (isooctyl mercaptoacetate), octyltin tristearate, butyltin tris (isooctyl maleate), octyltin tris (lauryl mercaptide), bis (butyltin diisooctyl mercaptopropionate) oxide, methyltin sulfide and methylthiostannoic acid.

3. The stabilizing composition of claim 2 wherein (2) is 4 to 12 weight per cent methyltin tris (isooctyl mercaptopropionate).

4. The stabilizing composition of claim 2 wherein (2) is 4 to 12 weight per cent butyltin tris (isooctyl mercaptoacetate).

5. The stabilizing composition of claim 2 wherein (2) is 4 to 12 weight per cent methyltin sulfide.

6. The stabilizing composition of claim 2 wherein (2) is 4 to 12 weight per cent methyl thiostannoic acid.

7. The stabilizing composition of claim 2 wherein (2) is 4 to 12 weight per cent butyltin tris (isooctyl maleate).

8. The stabilizing composition of claim 2 wherein (2) is 4 to 12 weight per cent octyltin tris (lauryl mercaptide).

9. The stabilizing composition of claim 2 wherein (2) is 4 to 12 weight per cent octyltin tristearate.

10. A polyvinyl chloride resin stabilized with 0.1 to 10% of the stabilizing composition of claim 1.

* * * * *